(12) United States Patent
Nino et al.

(10) Patent No.: US 7,173,733 B2
(45) Date of Patent: Feb. 6, 2007

(54) METHOD FOR MODELING COLOR HALFTONES

(75) Inventors: Cesar L. Nino, Newark, DE (US); Gonzalo R. Arce, Newark, DE (US)

(73) Assignee: University of Delaware, Newark, DE (US)

(*) Notice: Subject to any disclaimer, the term of this patent is extended or adjusted under 35 U.S.C. 154(b) by 1000 days.

(21) Appl. No.: 10/289,397

(22) Filed: Nov. 7, 2002

(65) Prior Publication Data

US 2004/0090640 A1    May 13, 2004

(51) Int. Cl.
*H04N 1/52*    (2006.01)
*H04N 1/60*    (2006.01)

(52) U.S. Cl. .................. 358/1.9; 358/504; 358/534

(58) Field of Classification Search .......... 358/1.9, 358/504, 534–536, 518, 530, 520, 521, 3.07, 358/3.21, 3.24; 382/162, 167; 356/402, 356/408, 421, 425
See application file for complete search history.

(56) References Cited

U.S. PATENT DOCUMENTS

| | | | | |
|---|---|---|---|---|
| 5,748,330 | A * | 5/1998 | Wang et al. | 358/504 |
| 6,435,654 | B1 * | 8/2002 | Wang et al. | 358/504 |
| 2003/0038954 | A1 * | 2/2003 | Odagiri et al. | 358/1.9 |
| 2005/0083346 | A1 * | 4/2005 | Takahashi et al. | 382/167 |
| 2005/0083540 | A1 * | 4/2005 | Hersch et al. | 358/1.9 |
| 2005/0094169 | A1 * | 5/2005 | Berns et al. | 358/1.9 |
| 2005/0111017 | A1 * | 5/2005 | Takahashi et al. | 358/1.9 |
| 2005/0169518 | A1 * | 8/2005 | Boston et al. | 382/162 |

OTHER PUBLICATIONS

A. Ufuk Agar et al., "An Iterative Cellular YNSN Method for Color Printer Characterization", School of Electrical and Computer Engineering Purdue University, West Lafayette, IN 47907.

A. Ufuk Agar, A Spectral Model for Halftone Color Prediction, Hewlett-Packard Laboratories, Palo Alto, CA 94304.

Patrick Emmel et al., "A Unified Model for Color Prediction of Halftoned Prints", Journal of Imaging Science and Technology, vol. 44, No. 4, Jul./Aug. 2000.

Patrick Emmel et al., "Predicting the Spectral Behaviour of Colour Printers for Transparent Inks on Transparent Support", Proceedings of the IS&T/SID 96 Color Imaging Conference: Color Science, Systems and Applications, Nov. 19-22, 1996, Scottsdale, Arizona, USA pp. 86-91.

* cited by examiner

*Primary Examiner*—Scott A. Rogers
(74) *Attorney, Agent, or Firm*—Connolly Bove Lodge & Hutz, LLP; Larry J. Hume

(57) ABSTRACT

A method for modeling color halftones that reduces both the number of parameters and the number of measurements needed to characterize an inkjet color printer. The method is based on the eigenanalysis of sample reflectance data and a probabilistic analysis that considers light scattering on the paper substrate as a breakage process governed by a log-normal distribution. The method estimates the reflectance of a print color by characterizing colors as a multiplicative composition of primary color reflectances rather than as an additive mixture of primary and secondary color reflectances as suggested by the theory of Neugebaeur.

25 Claims, 8 Drawing Sheets

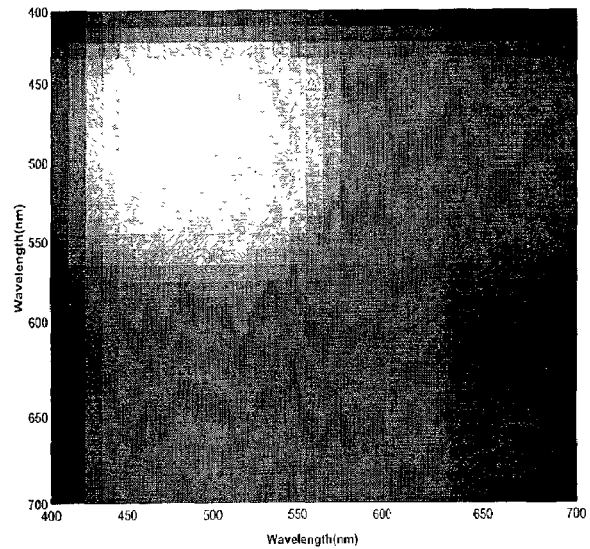 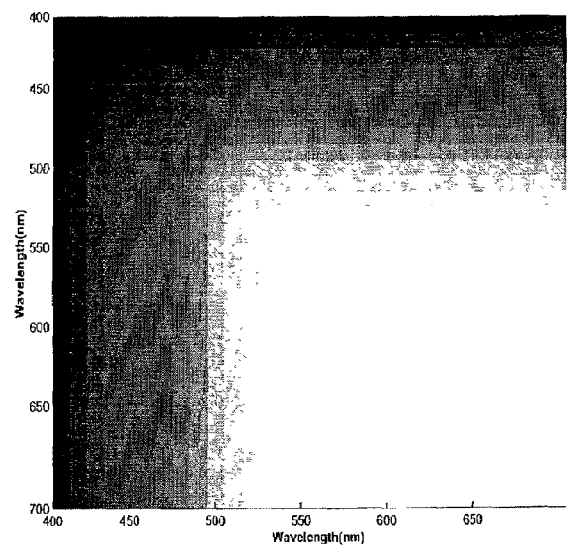
Fig. 4A Fig. 4B
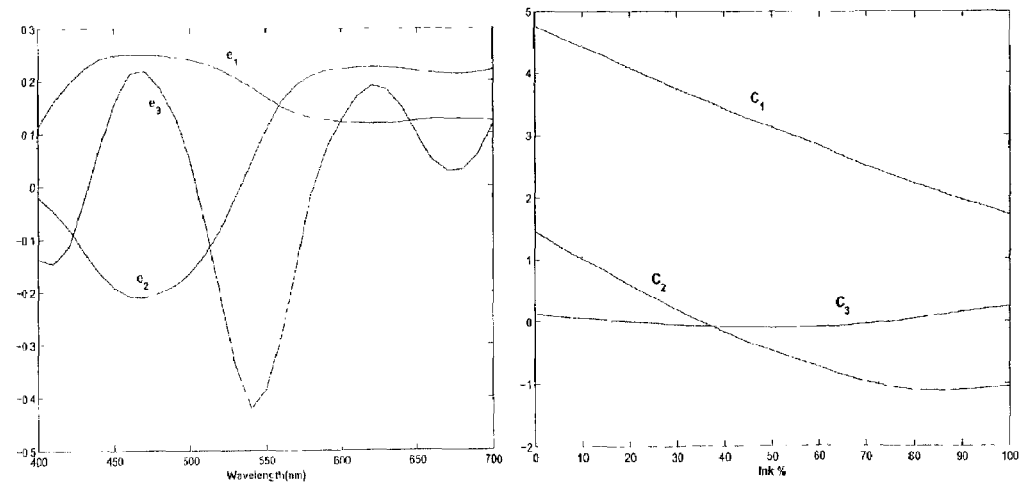
Fig. 5A Fig. 5B

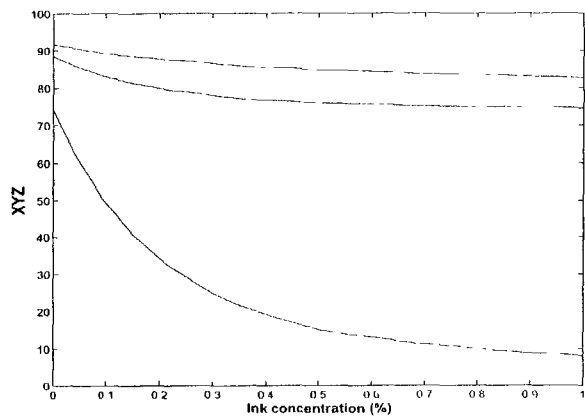
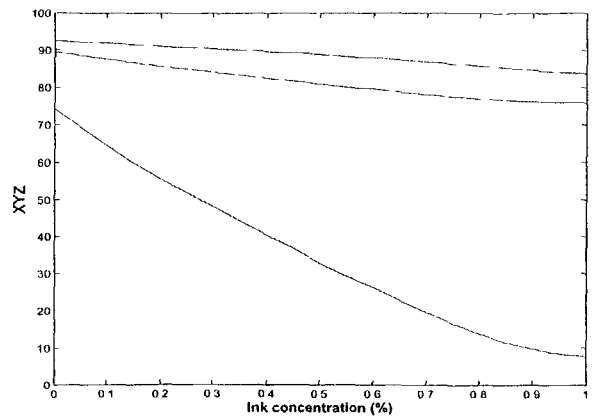
Fig. 8A                Fig. 8B
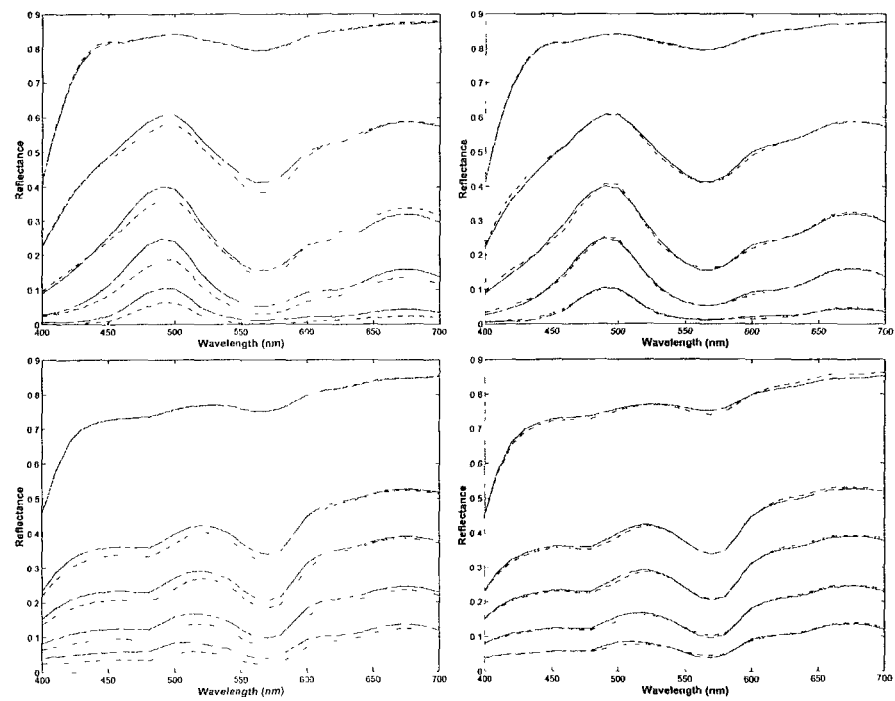
Fig. 9A                Fig 9B

METHOD FOR MODELING COLOR HALFTONES

BACKGROUND OF THE INVENTION

In the printing industry, color halftoning and color management are subjects that need to be continuously improved in order to get newer and more accurate ways to predict and reproduce color in a variety of media. In particular, color inkjet printers are devices where research and development efforts have been concentrated in the past several years. Inkjet printing involves a variety of physical phenomena, such as light scattering and ink spreading, which make accurate color prediction a difficult task.

The simplest approach to characterizing a color printer is to empirically take several calorimetric measurements over a wide range of color patches in a grid-like fashion. Interpolation of such data can be done to estimate the rest of the model, where the amount of error depends on the number of grid points taken into account. For example, in a Cyan, Magenta and Yellow (CMY) printer, small errors could be attained with around 8000 measurements. However, the amount of memory that is required to store this type of model is a major drawback. In addition, since the model characterizes a particular printer and media, this method lacks flexibility because a new set of colorimetric data is needed for each printer. An alternative approach that considerably reduces the number of parameters to be stored is to characterize the printing process with a spectral model.

Perhaps the earliest approach to a spectral model for monochrome halftoning was proposed by Murray and Davies in 1936 as a linear combination of reflectance and area of coverage. The Murray-Davies model was further extended by Neugebauer in 1937 to color halftones. The Neugebauer equations are built on the work of Demichel and consider a given area of photomechanical printing to be formed by eight different areas, each one covered by a different color: yellow, cyan, magenta, blue, green, red, black and white. The Demichel equations represent the corresponding eight fractional areas, which are fused by the eye in order to produce the sensation of a single color. The Neugebauer equations express the red, green and blue (RGB) tristimulus response in terms of such fractional areas and their reflectances. Denoting $a_i$ and $r_i(\lambda)$ as the fractional area of the $i^{th}$ colorant (i.e., Demichel coefficients) and the reflectance, respectively, the spectral Neugebauer equations for the total reflectance $r(\lambda)$ are given by $$r(\lambda) = \sum_{i=1}^{8} a_i r_i(\lambda), \qquad (1)$$

constrained to $$\sum_{i=1}^{8} a_i = 1.$$

That is, the total reflectance $r(\lambda)$ is an additive mixture of the reflectances $r_i(\lambda)$ of the eight fractional areas $a_i$.

Naturally, the reflectance is a continuous function of the wavelength. However, in practice, sampled values between 400 nm and 700 nm are used in most models since even modem spectrophotometers are just able to measure the reflection characteristics of an object at discrete wavelengths. The sample reflectance matrix $R_c$ of a given color is then a set of reflectances $r=[r(\lambda_0), r(\lambda_1), r(\lambda_2), \ldots, r(\lambda_k)]$ at discrete wavelengths $\lambda_i$, as shown in FIG. 1. Rewriting Eq. (1) in matrix form gives $$r = a R_c^T, \qquad (2)$$

where $r_i=[r_i(\lambda_0), \ldots, r_i(\lambda_k)]$, $a=[a_1, \ldots, a_8]$, and $R_c=[r_1^T, r_2^T, \ldots, r_8^T]$.

More recent approaches to spectral modeling for printer characterization make an empirical correction to Neugebauer's theory by finding a linear relationship between the densities of RGB and CMY. An example of this approach was proposed by Clapper in 1961. By using a second order transformation between the densities of RGB in the three color combinations and the principal densities of the individual primary color inks (i.e., CMY), the inaccuracies due to non-linear effects were reduced. Higher order equations may be used to reduce the error even further, as was shown by Heuberger et al in 1992.

However, a completely different approach from the above-discussed background art that reduces both the number of measurements and the number of parameters required is needed to more efficiently characterize the spectral model.

SUMMARY OF THE INVENTION

The method of the present invention estimates the reflectance of each color of ink as the product of the reflectance of the individual inks printed on the paper and the reflectance of the paper when there is no interference or overlap between inks. The reflectance of each color of ink is determined from the measurement of single color sample reflectances. A cross-spectrum of these measured sample reflectances is computed and the reflectance of the color is modeled as the product of spatial components and spectral components. These components are determined through an eigenanalysis of the cross-spectrum of the measured sample reflectance. Since most of the non-zero information in this eigenmodel of the reflectance exists in a small number of eigenvectors (i.e., spectral components) and eigencoefficients (i.e., spatial components), the eigenanalysis leads to an estimated reflectance model that provides a significant reduction in the order of the model and the complexity of computations as compared to background art reflectance models. When there is either interference between inks or total overlap of inks, the reflectance is changed from the non-interfering ink case and the method of the invention modifies the measured reflectance and estimated reflectance by applying spatial or spectral correction factors. In addition, the method provides for tone calibration for both the interfering and non-interfering cases by linearizing the appropriate eigencoefficients.

BRIEF DESCRIPTION OF THE DRAWINGS

FIG. 4A and illustrates the cross-spectrum estimate S of the measured sample reflectances of cyan. Lighter tones represent high activity areas.

FIG. 4B illustrates the cross-spectrum estimate S of the measured sample reflectances of yellow. Lighter tones represent high activity areas.

FIG. 5A illustrates eigenvectors for the cyan channel of an inkjet printer. In this example, every sample reflectance is formed by K=31 measurements evenly spaced in the 400 nm 700 nm range. The matrix $R_m$ is formed by N=20 sample reflectances.

FIG. 5B illustrates the eigencoefficients for the cyan channel of an inkjet printer. In this example, every sample reflectance is formed by K=31 measurements evenly spaced in the 400 nm 700 nm range. The matrix $R_m$ is formed by N=20 sample reflectances.

FIG. 8A illustrates the calorimetric XYZ values of error diffused yellow ink before linearization of the first eigenvector of the cross-spectrum estimate S.

FIG. 8B illustrates the colorimetric XYZ values of error diffused yellow ink before after linearization of the first eigenvector of the cross-spectrum estimate S.

FIG. 9A illustrates the estimated (dashed line) and measured (solid line) eigenvectors for stochastic dithering.

FIG. 9B illustrates the estimated (dashed line) and measured (solid line) eigencoefficients for stochastic dithering.

DETAILED DESCRIPTION

The method of the present invention is based on an eigenanalysis of color sample reflectance data and a simplifying probabilistic analysis. Unlike other background art methods involving probability theory, the method of the present invention considers the scattering of light on the paper substrate as a breakage process governed by a log-normal distribution. In this method the macro reflectance of a print color is a multiplicative composition of the primary reflectances in contrast to being to an additive mixture, as in the above-discussed background art. The method can be applied to clustered ordered dithering and to stochastic dithering, where for each case the eigenanalysis is performed by employing single ramp-ups of the primary colors (e.g., cyan, magenta and yellow). The method reduces both the number of parameters and the number of measurements required for printer characterization. For the case of two color mixtures, a maximum average color difference CIELab $\Delta E$ equal to 1.34 and, for three color mixtures, an average CIELab $\Delta E$ equal to 2.13 was obtained in experimental results that further validate the accuracy of the method.

Figure 1:
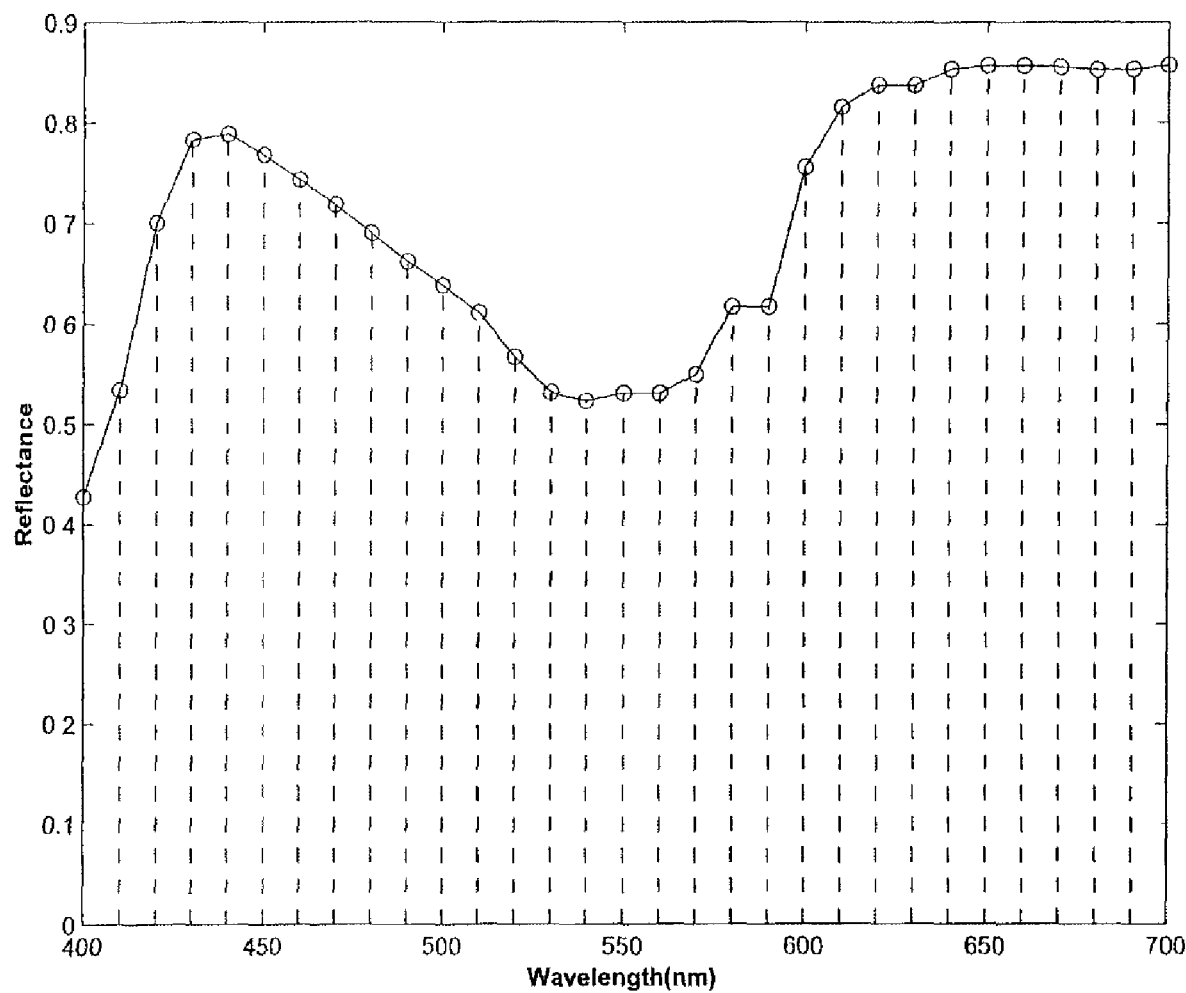
FIG. 1 illustrates the output of a spectrophotometer that samples and measures the reflectance at different wavelengths, forming the sample reflectance of a given object.
Figure 2:
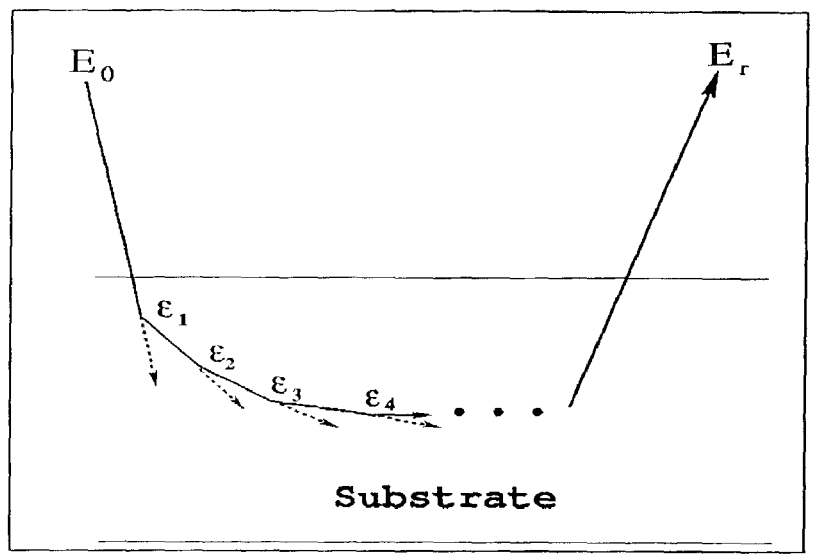
FIG. 2 illustrates how a beam of light splits and changes trajectory many times before it is reflected to the source.

In accordance with a preferred embodiment of the invention, samples of reflected light are measured and used to generate a measured reflectance matrix $R_m = [r_1^T | r_2^T |, \ldots, |r_N^T]$, where the vectors $r_i$ are the sample reflectances measured from a color patch where each component of the vector $r_i$ represents the reflectance at a different wavelength $\lambda$ and shows the evolution of the reflectance from 0 to 100 percent for a given color. The reflected light is in the portion of the electromagnetic spectrum perceived by the human eye with wavelengths between 400 nm and 700 nm. A photon is the smallest quantity of spectrally pure light. In a strict physical sense, a beam of light is formed by a flux of photons that move at the speed of light carrying certain amounts of energy at certain wavelengths. An initial positive variable $E_o$ denotes the initial energy of a single photon in a beam of light. When light goes into a surface (e.g., paper), the photon carrying energy $E_o$ changes direction depending on physical properties of the paper (i.e., due to the scattering). In each internal reflection $\epsilon_j$, the energy of the photon splits between several trajectories until some of the initial light is reflected and the remaining part of the energy of the photon has been transmitted, as shown in FIG. 2. Since every reflection occurs with certain probability, the energy reflected $E_r$ back to the source after n internal reflections can be written as $$E_r = E_o \prod_{j=1}^{n} \epsilon_j, \quad (3)$$

where the internal reflections $\epsilon_j$ in the media are independent random variables in the range [0,1]. The energy reflected $E_r$ back are the measured reflectance samples $R_m$. The total energy of the source is the addition of all single photons. The ratio between the energy reflected $E_r$ and the initial energy $E_o$ is the reflectance of the media $\dot{r}$. In a particular beam of light, the reflectance $\dot{r}$ is a random variable defined as $$\dot{r} = \frac{E_r}{E_o}. \quad (4)$$

Since every internal reflection $\epsilon_j$ is independent and possesses finite variance, the central limit theorem of probability theory states that the distribution of $$\log(\dot{r}) = \sum_{j=1}^{n} \log(\epsilon_j)$$

tends to be Gaussian when n goes to infinity. Thus, the reflectance $\dot{r}$ is governed by a log-normal distribution and the internal reflections $\epsilon_j$ in the media can be modeled as a breakage process whose distribution asymptotically tends to the log-normal distribution. The reflectance r of the media may be defined as $r = E\{\dot{r}\} = \exp(\mu + \sigma^2/2)$, which is the expected value of a log-normal distribution. Further, as the reflectance r is also a function of the wavelength $\lambda$, a final expression can be given as $$r(\lambda) = \exp(\mu(\lambda) + \sigma^2(\lambda)/2). \quad (5)$$

Figure 3:
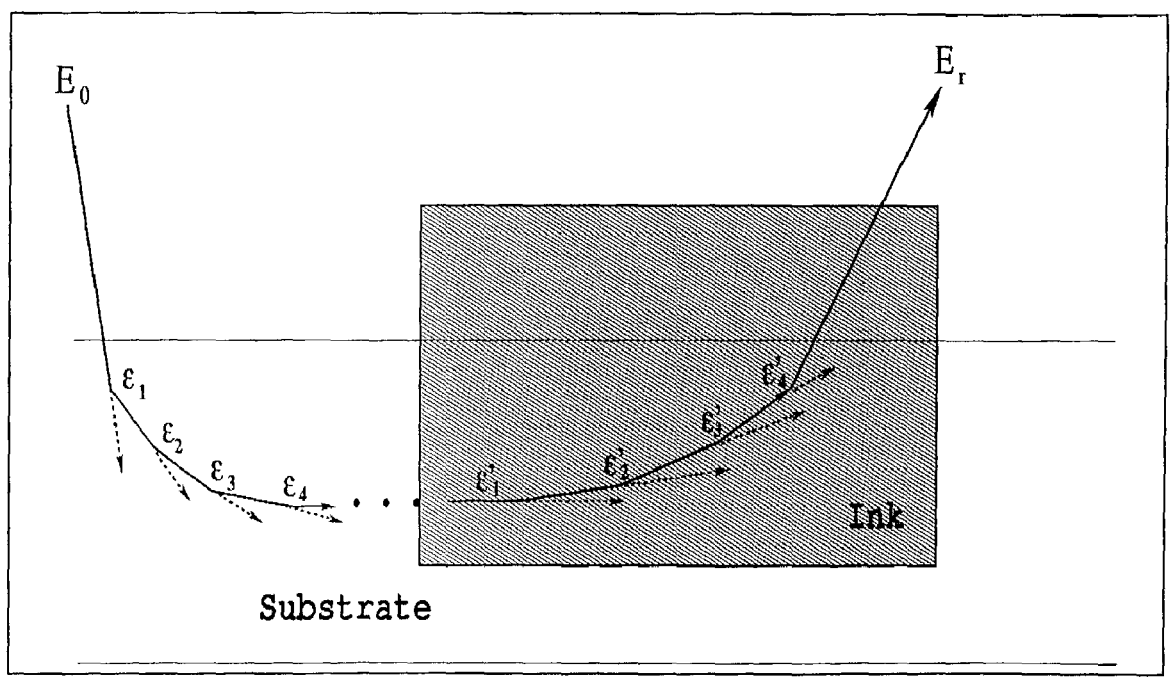
FIG. 3 illustrates how the absorption of the substrate changes affecting the trajectory and the amount of energy reflected towards the source when ink is printed on paper.

When ink is printed on a paper media, as in halftoning, scattering occurs in the same way as discussed above but the coefficients $\epsilon_j$ change because physical properties of the paper change. In particular, the absorption of the paper changes as a function of the wavelength $\lambda$. Thus, Eq. 3 is rewritten as $$E_r = E_o \prod_{j=1}^{n} \epsilon_j \prod_{i=1}^{m} \epsilon'_i, \quad (6)$$

where $\epsilon_j$ and $\epsilon'_i$ represent the coefficients due to internal reflections in the paper and the ink, respectively, as shown in FIG. 3. Following a similar analysis as discussed above, clearly the new distribution of log ($\dot{r}(\lambda)$) is Gaussian with mean and variance equal to the addition of the respective means $\mu_i$, $\mu_j$ and variances $\sigma_i$, $\sigma_j$. The distribution of $\dot{r}$ is again log-normal, and $$r(\lambda) = \exp(\mu_p + \sigma^2_p/2)\exp(\mu_I + \sigma^2_I/2) = r_p(\lambda) r_I(\lambda), \quad (7)$$

where $r_i(\lambda)$ and $r_p(\lambda)$ denote the reflectances of the ink (on the paper) and the paper, respectively.

Further, if two point processes (e.g., halftone patterns) are generated such that no overlapping of dots occurs, it can be shown that the new distribution of the reflectance $\hat{r}$ is also log-normal, with parameters inherited from the prior distributions. Under this condition, the new expected value of the reflectance $r(\lambda)$ may be written as $$r(\lambda) = r_p(\lambda) \prod_{i=1}^{k} r_i(\lambda), \quad (8)$$

where $r_p(\lambda)$ is the reflectance of the paper and $r_i(\lambda)$ is the reflectance of the ith ink component on the paper, respectively. That is, when there is no interference or overlap between inks, the reflectance of a patch of color $r(\lambda)$ is given by the product of the reflectance of the individual colors of inks $r_i(\lambda)$ printed on the paper and the reflectance of the paper $r_p(\lambda)$.

The sample reflectances are measured using conventional laboratory equipment such as a spectrophotometer. The sample reflectances are measured at different wavelengths and at different ink densities to form the measured sample reflectance matrix $R_m$ for a color patch.

Eigenanalysis of the measured sample reflectance matrix $R_m$ is very effective for the extraction of information about the sample reflectances and in the efficient modeling of the reflectance. A sample reflectance vector $r_{l \times K}$ represents the sample reflectances measured from a color patch, where each of the K entries represents the reflectance at a different wavelength $\lambda$. A set of N measured sample reflectance vectors $\{r_0, r_1, \ldots, r_N\}$ are collected, where every sample is taken from a patch with a different concentration of color, ranging from 0 to 100 percent in ascending order. The reflectance matrix $R_m = [r_1^T | r_2^T |, \ldots, |r_N^T]$, shows the evolution of the reflectance from 0 to 100 percent for a given color. The eigenanalysis approach uses the signal processing concept of cross-correlation, where similarities in the samples are used to extract important features of a set of data. The cross-spectrum estimate S of $R_m$ is computed as $$S = R_m R_m^T. \quad (9)$$

The cross-spectrum estimate S synthesizes the frequency activity of the set of N measured sample reflectance vectors in the measured reflectance matrix $R_m$, as shown in FIG. 4A and FIG. 4B, where the cross-spectrums of cyan and yellow show higher activity in low and mid-high frequencies, respectively. In these figures, lighter tones represent areas of high activity and darker tones represent areas of low or no activity.

A feature of the cross-spectrum estimate S is that it usually has few eigenvalues other than zero, which indicates that all the information of the samples is located in a few components. Since the cross-spectrum estimate S is a Hermitian matrix, the set of K eigenvectors form a measured orthonormal basis $Q_m = [e_1^T | e_2^T |, \ldots, |e_K^T]$, where the vector $e_i$ corresponds to the $i^{th}$ eigenvector of S. Since many of the eigenvalues are equal to zero, projection of $R_m$ onto $Q_m$ yields a more compact representation. Mathematically, this can be expressed by defining the set of eigencoefficients $$C_m = R_m^T Q_m = [c_1^T | c_2^T |, \ldots, |c_K^T], \quad (10)$$

where each vector of eigencoefficients is $c_1 = e_i R_m$ and $C_m$ is the measured eigencoefficient matrix. As in low-rank modeling, all vectors of eigencoefficients $c_i$ with a norm close or equal to zero may be discarded, yielding an estimated eigencoefficient matrix $$C_e = [[c_1^T | c_2^T |, \ldots, c_l^T], \quad l < K. \quad (11)$$

Figure 6:
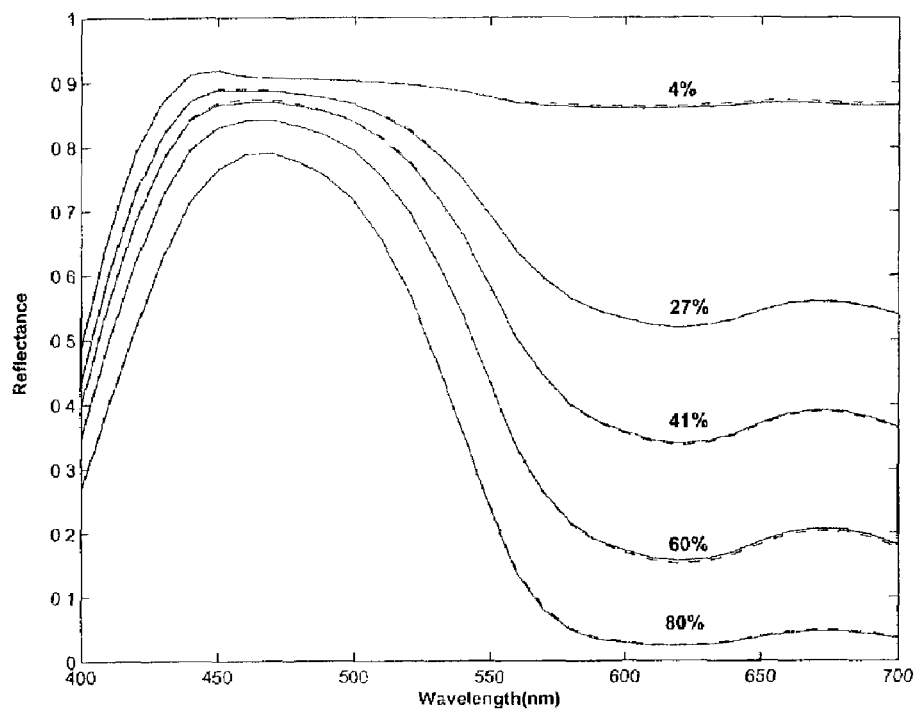
FIG. 6 illustrates estimated reflectances (dotted line) of a third order eigenmodel for the cyan channel of an inkjet printer and measured reflectances (solid line).

The estimated reflectance matrix $R_e$ can then be computed as $$R_e = C_e Q_e^T, \quad (12)$$

where $Q_e = [e_1^T | e_2^T |, \ldots, |e_l^T]$ and $R_e$ is the estimated reflectance matrix formed by those eigenvectors whose corresponding eigenvalues are not zero. Thus, $R_m$ may be represented more efficiently by $R_e$ which uses a smaller number of components $l < K$, where l is the order of the estimated model. As an example, FIG. 5A and FIG. 5B show the eigenvectors $e_i$ and eigencoefficients $c_i$, respectively, of a third order model for the cyan channel of an inkjet printer. In FIG. 6, the estimated reflectances of a third order eigenmodel for the cyan channel of an inkjet printer (dotted line) and the measured reflectances (solid line) are shown. A close match between the estimated and measured reflectance is obtained, as indicated by FIG. 6. A particular estimated sample reflectance vector $r_e$ is calculated from the reduced set of eigenvectors $Q_e$ as $$r_e = w Q_e, \quad (13)$$

where w is a vector of dimension $1 \times l$ interpolated from each set $c_1, c_2, \ldots, c_l$ at a particular ink concentration.

Figure 7:
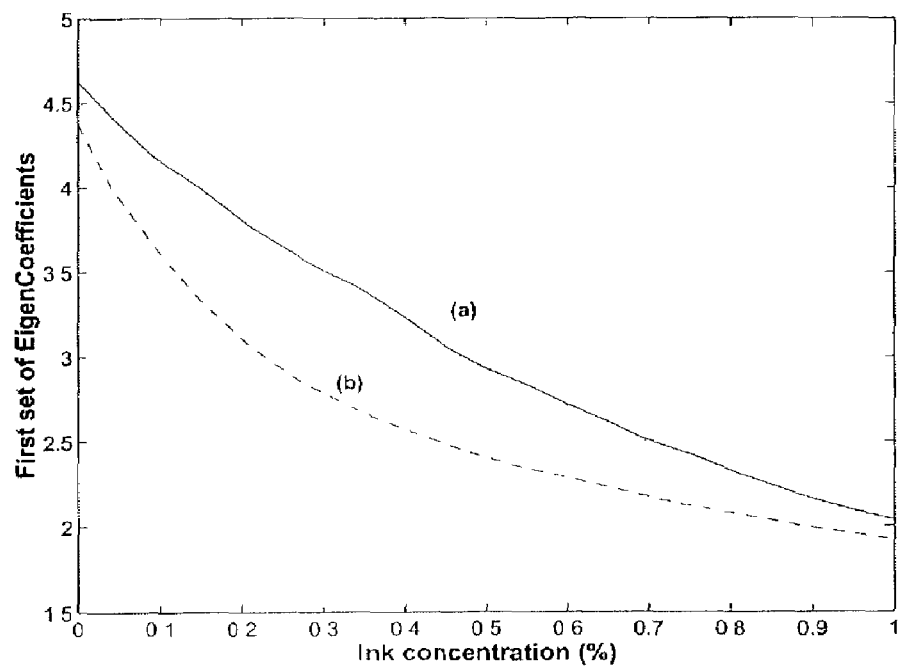
FIG. 7 illustrates a first set of eigencoefficients for (a) clustered ordered dithering and (b) error diffusion.

A feature of this eigenmodel for reflectance is that it allows for the modeling of the reflectance as the combination of frequency components and spatial components, which are independent. The frequency components correspond to the eigenvectors $e_i$ and they show, although just in a qualitative manner, how the absorption of the ink changes with the wavelength $\lambda$. The spatial components correspond to eigencoefficients $c_i$. Typically, the first eigenvector $e_1$ and its associated eigencoefficients $c_1$ have more than 90 percent of the actual representation of the reflectance $R_e$, where the eigencoefficient $c_1$ is a set of values that always decreases monotonically, as shown in FIG. 5B. Also, the first set of eigencoefficients $c_1$ seems to be related in some way to the actual empty-space function that governs the halftoning of the printing. FIG. 7 shows an example of the empty-space function for the two halftoning methods of (a) clustered ordered dithering and (b) error diffusion. Since the size of the dots varies according to the tone level (i.e., amplitude modulated halftoning), clustered ordered dithering shows more linearity in its spatial behavior as a result of the more uniform distribution of ink.

In tone calibration of the color channels of a printer, it is usually required to linearize ink coverage. An alternative to the background art approach of using density measurements is to linearize the first vector of eigencoefficients $c_1$, as shown in FIG. 8A, before linearization, and in FIG. 8B, after linearization. Since reflectance is directly related to calorimetric measures, this method efficiently linearizes tones in a XYZ color space. This linearizing step optimizes the distribution of color according to the concentration of a given ink and can be used in the color prediction model for stochastic dithering.

The eigenmodel representation presented above is very similar to Neugebauer's equations, where the number of important components l is analogous to the number of colors of ink and color mixtures involved in the printings. This means that the number of parameters needed to model a particular color channel is the same as Neugebauer's but yields a much more precise modeling of the behavior of a color channel.

Since this method is not based on the actual physics involved in light reflection, it cannot be used to estimate the behavior of color mixtures. However, analysis of ramp-ups formed by particular color mixtures, for example cyan=50% and magenta={0, 10, 20, . . . , 100%}, is possible. In order to predict the behavior of color mixtures, a method where eigenmodels for every single color ink channel are used to estimate the reflectance of any color mixtures is required and further discussed below.

When two dots of different inks are printed one on top of another, an analysis of the internal reflections of light may be done following the above-discussed theory of breakage. Neglecting the effect of ink mixing, the macro reflectance of the composition of the overlapping point processes may be written as $$E_r = E_o \prod_{j=1}^{n'} \varepsilon_j \prod_{i=1}^{m'} \varepsilon'_i, \quad (14)$$

where the internal reflection coefficients $\varepsilon$ are the same as in the case of single primary color channels since these internal reflection coefficients $\varepsilon$ are an intrinsic characteristic of every ink and the media. What is different in the expression is the number of internal reflections n' and m', because the actual empty space functions of the processes were affected by overlapping. This implies that the new macro reflectance is also a product between reflectances due to the paper and each printed ink, although the individual values for each primary color channel is undetermined. Unlike the non-overlapping inks case, the behavior of each primary color channel cannot be inferred from individual measurements since their empty-space function would be different. Nonetheless, experimental results indicate the spectral behavior (i.e., related to the eigenvectors $e_i$) are basically the same. Thus, assuming that the biggest mismatch between measured and estimated data is due to spatial variations (i.e., related to the eigencoefficients $c_i$), the color deviation may be corrected by using the measured set of eigencoefficients $C_m$ computed through the above-discussed eigenanalysis of the measured cross-spectrum estimate S. Regardless of the halftoning scheme used, the estimated reflectance matrix $R_e$ and measured reflectance matrix $R_m$ can be computed from their associated eigenvectors $Q_e$, $Q_m$ and eigencoefficients $C_e$, $C_m$, respectively. Thus, a spatial correction factor may be applied by computing an estimated reflectance matrix with spatial correction $R'_e$ as $$R'_e = C_m Q_e. \quad (15)$$

Examples of the estimated reflectance (dotted lines) before and after spatial correction are shown in FIG. 9A and FIG. 9B, respectively. The measured reflectance (solid line) is also shown in FIG. 9A and FIG. 9B for comparison. Error deviations before and after application of a spatial correction factor are shown in Table I.

TABLE I

| Halftoning Method | Before Correction | | After Correction | |
|---|---|---|---|---|
| | ΔE | Max ΔE | ΔE | Max ΔE |
| Rotated screen | 4.15 | 9.10 | 0.97 | 1.43 |
| Error Diffusion | 5.02 | 11.59 | 1.23 | 3.71 |

As discussed above, the reflectance of a patch of color $r(\lambda)$ can be estimated as the product of the reflectance of each individual color of ink $r_i(\lambda)$ printed on the paper and the reflectance of the paper $r_p(\lambda)$, as given in Eq. 8. The behavior of each individual color of ink can be determined from single color prints and modeled as the product between the spatial components and spectral components found by eigendecomposition of their respective cross-spectrum estimates S. When there is no spatial interference between the point patterns of a multi-colored halftone, this characterization yields very good accuracy. When the spatial interference exist between the point patterns of two dots printed one on top another, a spatial correction factor can be computed as given in Eq. 15, which also yields very good accuracy.

However, when the spatial interference is not due to the point patterns of two dots being printed on top of one another but instead due to the point patterns partially overlapping, the spatial interference between the two or more spatial point patterns modifies the number of internal reflections $\varepsilon$ that every single photon suffers before being reflected back to the source. The effect of this type spatial interference on the breakage process is a change in the mean and the variance of the distribution function as compared to the previous cases. For this case, a spectral difference correction factor $\Delta(\lambda)$ can be computed to correct the difference between the estimated and the measured values of $\mu$ and $\sigma^2/2$ can be found as $$\Delta(\lambda) = (\mu_e(\lambda) - \mu_m(\lambda)) + (\sigma^2_e(\lambda) - \sigma^2_m(\lambda))/2 = \log(r_e(\lambda)) - \log(r_m(\lambda)), \quad (16)$$

where $r_e(\lambda)$ and $r_m(\lambda)$ are the estimated reflectances and measured reflectances, respectively. This spectral difference correction factor $\Delta(\lambda)$ can be included as an empirical correction of Eq. 8 as $$r(\lambda) = r_p(\lambda) \prod_{i=1}^{k} r_i(\lambda) e^{-\Delta(\lambda)} \quad (17)$$

That is, when there is either total overlap of the inks or merely partial interference between the inks, the reflectance is changed from the non-interfering ink case of Eq. 8, and the reflectance of the color patch $r(\lambda)$ is modified by applying a spatial correction factor (i.e., Eq. 15) or a spectral difference correction factor (i.e., Eq 16).

Figure 10:
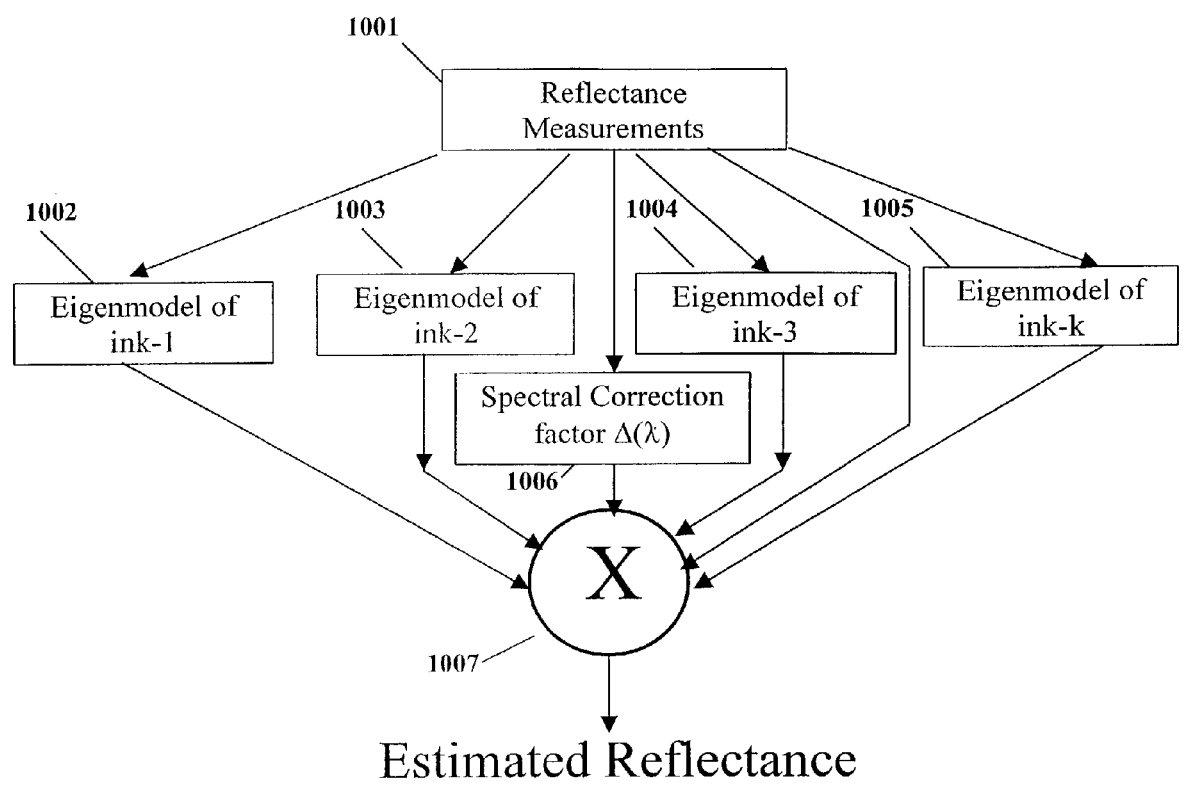
FIG. 10 is a flow diagram illustrating the computation of the reflectance with spectral correction for the case of interfering colors of ink.

FIG. 10 shows a flow diagram implementation of Eq. 17 for the case where a spectral difference correction factor $\Delta(\lambda)$ is applied. In FIG. 10, up to K individual ink colors are used to form an estimated reflectance. For example, if K=3, eigenmodels 1002, 1003 and 1004 could estimate the primary color inks C, M and Y, respectively. If necessary, the spatial correction factors would be computed within the eigenmodels 1002, 1003, 1004 for each color of ink. In addition, the spectral difference correction factor $\Delta(\lambda)$ is computed according to Eq. 16 by element 1005. The multiplier 1006 computes the product of the individual ink reflectances $r_i(\lambda)$, the reflectance of the paper $r_p(\lambda)$ and the exponential of the spectral correction factor $\Delta(\lambda)$ and outputs the estimated reflectance r(k). Further, the case of non-overlapping inks, as given by Eq. 8, can be realized by deleting the spectral difference correction factor $\Delta(\lambda)$ element 1005 from FIG. 10.

Figure 11A:
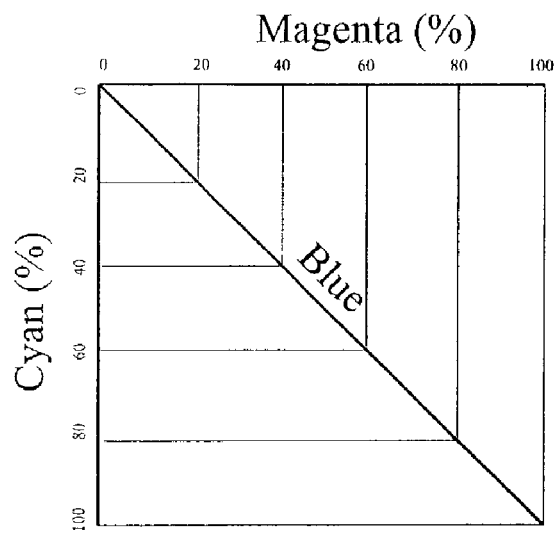
FIG. 11A illustrates how values of $\Delta(\lambda)$ for CM color mixtures may be determined from blue measurements.
Figure 11B:
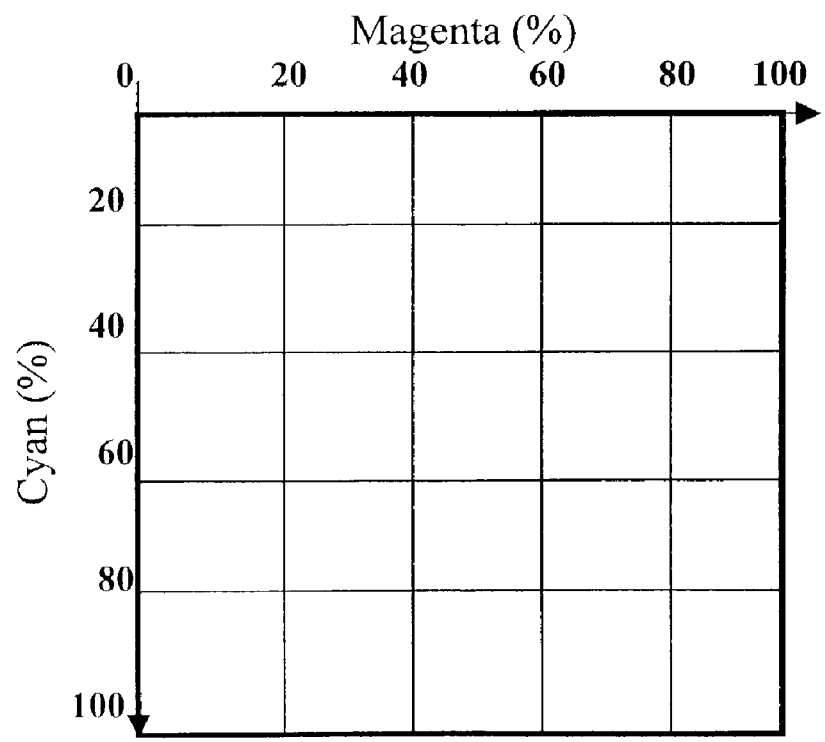
FIG. 11B illustrates how values of $\Delta(\lambda)$ for CM color mixtures may be determined from sample measurements displayed in a grid-like structure.

In addition, when the inks of two primary color overlap, the values of the spectral difference correction factor $\Delta(\lambda)$ can be determined from measurements of each color of ink with equal ink concentrations, and then interpolating the measurements to find the corresponding value of the spectral difference correction factor $\Delta(\lambda)$ values at different ink concentration levels. For example, the spectral difference correction factor $\Delta(\lambda)$ for a color mixture of cyan and magenta can be determined from blue measurements, as shown in FIG. 11A. Alternatively, an increased number of sample measurements, distributed in a grid-like fashion as shown in FIG. 11B, can be taken to improve the accuracy of the spectral difference correction factor $\Delta(\lambda)$ and yield even higher accuracy in the estimates.

Experimental Results

As a demonstration of the method, 5 sample reflectances were measured for each primary color: cyan C, magenta M and yellow Y; and for each color mixture: CM, CY and MY. All the sample reflectances are evenly spaced, ranging from 0 to 100%. Additionally, the sample reflectance of the paper substrate is also measured. All printings were done with an EPSON 5500 Stylus printer. The measurements were taken with a spectrophotometer XRite 938. The spectral data for each sampled color patch was measured from 400 nm to 700 nm with frequency intervals of 10 nm. Thus, the spectral data of each color patch consists of 31 points. Further, from the initial set of measurements for C, M and Y, the reflectances values were estimated for the color mixtures CM, CY and MY. The spectral difference correction factor $\lambda(\Delta)$ of the respective reflectances was then calculated as in Eq. 16 for each color mixture. By using a total of 31 measurements (i.e., 10×3 colors of ink plus the paper substrate) we estimated 121 evenly spaced points in the 2-D space formed by every color mixture, CM, CY and MY. The CIELab tristimulus produced by a D50 standard illuminant on the spectral reflectances of the same color points were measured with the spectrophotometer and then used to compute the errors $\Delta E$. The results are shown in Table II.

TABLE II

| Ink Combination | $\Delta E$ | Max $\Delta E$ | RMS $\Delta E$ |
|---|---|---|---|
| MY | 0.95 | 3.57 | 1.47 |
| CY | 1.22 | 6.4 | 1.68 |
| CM | 1.34 | 4.79 | 1.71 |

Figure 12:
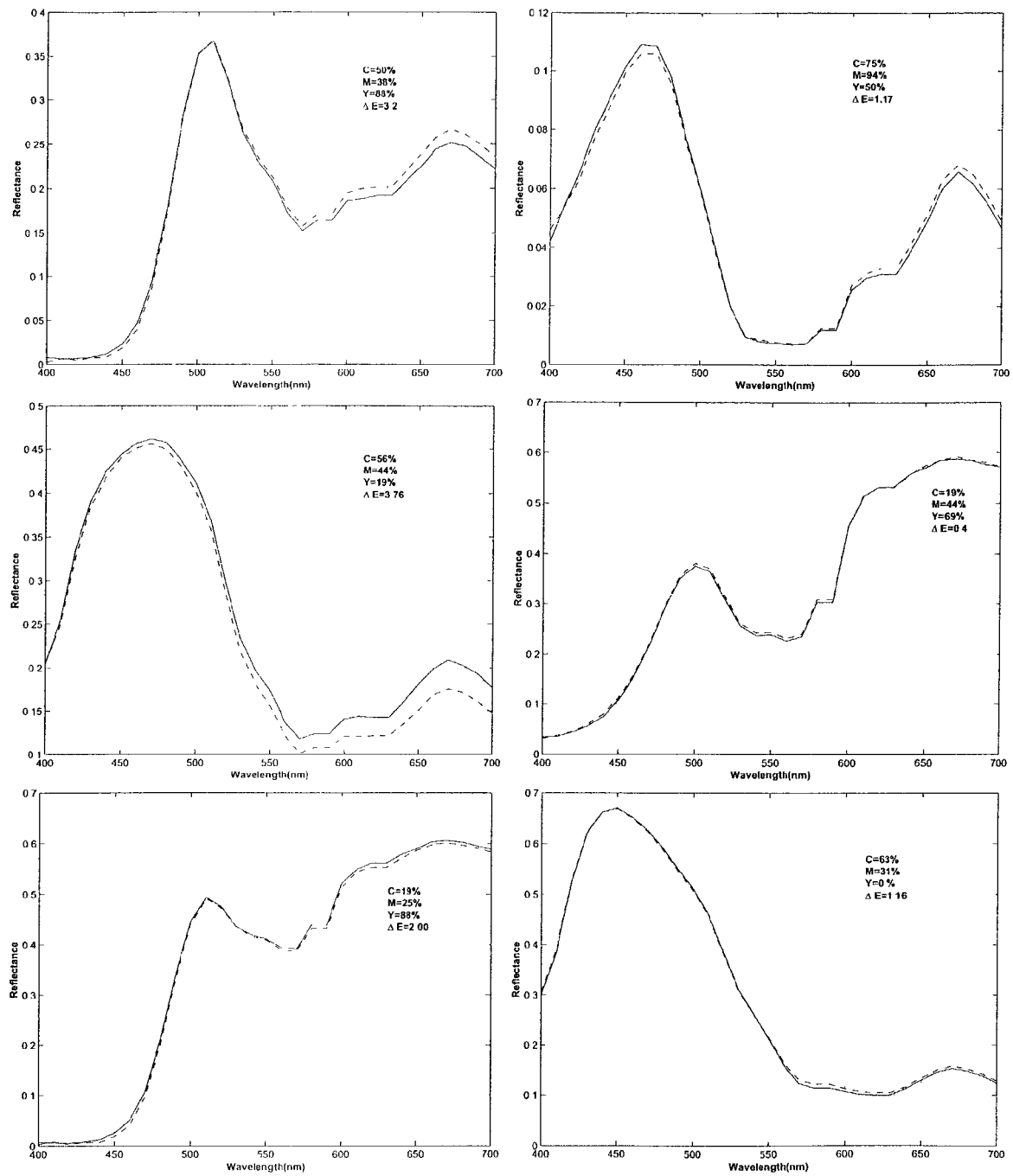
FIG. 12 illustrates estimated reflectances (dashed lines) and measured reflectances (solid lines) of error diffusion color halftones for various three-ink combinations.

In order to test three-ink color mixtures, a bigger set of measurements was done by using the Xrite Spectrofiler. A test chart of 4913 evenly spaced color samples in the CMY space was used to calculate the error between estimated and measured reflectance data. In a first test, the model was created by printing ramp-ups of 16 evenly spaced ink concentrations for each channel (i.e., C, M and Y). An additional set of 20 evenly-spaced color prints was used to interpolate the values of the spectral difference $\Delta(\lambda)$. The average CIELab $\Delta E$ was equal to 3.6 units, with a RMS $\Delta E$ of 4.5 units. In a second test, the set of data used to calculate the correction parameter $\Delta(\lambda)$ was increased to 112 color samples. In this case, the average CIELab $\Delta E$ was reduced to 2.13 units, with a corresponding RMS $\Delta E$ equal to 2.51 units. For the latter case, FIG. 12 shows some results of the estimated reflectances versus the measured reflectances.

The invention being thus described in terms of preferred embodiments, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for modeling reflectances of a color of ink, comprising:
   measuring sample reflectances of a color of ink;
   computing the cross-spectrum of the sample reflectances of the color of ink;
   performing an eigenanalysis of the cross-spectrum estimate of the sample reflectances;
   computing an eigenmodel estimated reflectance of the color of ink from results obtained from the eigenanalysis of the cross-spectrum estimate.

2. A method according to claim 1, wherein the eigenmodel estimated reflectance is obtained by computing a product of matrices of non-zero eigenvectors and of non-zero eigencoefficients obtained from the eigenanalysis of the cross-spectrum estimate.

3. The method of claim 2, wherein the eigencoefficients of the eigenmodel estimated reflectance are linearized for tone calibration.

4. A method for modeling color halftones, comprising:
   measuring sample reflectances of at least one color of ink;
   measuring sample reflectances for a paper on which the color of ink is printed;
   computing a cross-spectrum estimate of the at least one color of ink from the sample reflectances;
   performing an eigenanalysis of the cross-spectrum estimate of the at least one color of ink;
   computing an eigenmodel estimated reflectance for the at least one color of ink;
   computing an estimated reflectance as the product of the eigenmodel estimated reflectance for the at least one color of ink and a reflectance of the paper on which the at least one color of ink is printed.

5. The method of claim 4, wherein the eigenmodel estimated reflectance for the
   at least one color of ink is obtained by computing the eigenmodel estimated reflectance as a product of matrices of non-zero eigenvectors and of non-zero eigencoefficients obtained from the eigenanalysis of the cross-spectrum estimate of the at least one color of ink.

6. The method of claim 4, wherein the estimated reflectance is provided with a spatial correction factor by computing the eigenmodel estimated reflectance as product of matrices of non-zero eigenvectors and of measured eigencoefficients obtained from the eigenanalysis of the cross-spectrum estimate of the at least one color of ink.

7. The method of claim 4, wherein the estimated reflectance is provided with a spectral difference correction factor by
   computing the spectral difference correction factor as a difference between a logarithm of the eigenmodel estimated reflectance and a logarithm of measured reflectance; and
   multiplying the eigenmodel estimated reflectance of the at least one color by the spectral difference correction factor.

8. The method of claim 4, wherein the estimated reflectance is provided with a spectral difference correction factor by
measuring a reflectance of two colors of ink with equal concentrations;
interpolating the measurements of the reflectance of the two colors of ink to determine the spectral difference correction factor;
multiplying the spectral difference correction factor by the estimated reflectance.

9. The method of claim 4, wherein the estimated reflectance is provided with a spectral difference correction factor by
measuring a sample reflectances of two colors of ink in a grid-like fashion; and
interpolating the measurements of the reflectance of the two colors of ink to determine the spectral difference correction factor;
multiplying the spectral difference correction factor by the estimated reflectance.

10. A method for modeling reflectances of a color of ink, comprising:
measuring sample reflectance vectors of the color of ink;
transposing the sample reflectance vectors to form columns of a measured reflectance matrix of the color of ink;
computing a cross-spectrum estimate matrix of the color of ink from the measured reflectance matrix;
determining eigenvectors of the cross-spectrum estimate matrix;
forming a measured orthonormal basis matrix of the color of ink from with the eigenvectors of the cross-spectrum estimate matrix;
computing a measured eigencoefficient matrix of the color of ink by projecting the measured sample reflectance matrix onto the measured orthonormal basis matrix;
removing all column vectors of eigencoefficients with a norm of approximately zero from the measured eigencoefficient matrix to obtain an estimated eigencoefficient matrix of the color of ink;
removing all eigenvectors whose corresponding eigenvalues are zero from the measured orthonormal basis matrix to produce an estimated orthonormal basis matrix of the color of ink; and
computing an estimated reflectance matrix of the color of ink from the matrix product of the estimated eigencoefficient matrix and a transpose of the estimated orthonormal basis matrix,
wherein each of the sample reflectance vectors has components that represent the reflectance at different wavelengths; and
each of the sample reflectance vectors is taken from a different concentration of the color of ink.

11. The method of claim 10, wherein the different concentration of the color of ink range from 0 to 100 percent in ascending order.

12. The method of claim 10, wherein the column vectors of the estimated eigencoefficient matrix are linearized for tone calibration.

13. A method for modeling color halftones, comprising:
measuring sample reflectance vectors of at least one color of ink;
measuring a sample reflectance vector for a paper on which the at least one color of ink is printed;
transposing the sample reflectance vectors to form columns of a measured reflectance matrix of at least one color of ink;
computing a cross-spectrum estimate matrix of the measured reflectance matrix of the at least one color of ink;
determining eigenvectors of the cross-spectrum estimate matrix for the at least one color of ink;
forming a measured orthonormal basis matrix for the at least one color of ink from the eigenvectors of the cross-spectrum estimate matrix of the at least one color of ink;
computing a measured eigencoefficient matrix for the at least one color of ink by projecting the measured sample reflectance matrix for the at least one color of ink onto the measured orthonormal basis matrix for the at least one color of ink;
removing all column vectors of eigencoefficients with a norm of approximately zero from the measured eigencoefficient matrix for the at least one color of ink to obtain an estimated eigencoefficient matrix for the at least one color of ink;
removing all eigenvectors whose corresponding eigenvalues are zero from the measured orthonormal basis matrix for the at least one color of ink to produce an estimated orthonormal basis matrix for the at least one color of ink;
computing an eigenmodel estimated reflectance matrix for the at least one color of ink from the matrix product of the estimated eigencoefficient matrix for the at least one color of ink and a transpose of the estimated orthonormal basis matrix for the at least one color of ink;
computing an estimated reflectance as the product of the eigenmodel estimated reflectance for the at least one color of ink and a reflectance of the paper on which the at least one color of ink is printed,
wherein each of the sample reflectance vectors has components that represent the reflectance at different wavelengths; and
each of the sample reflectance vectors is taken from a different concentration of the at least one color of ink.

14. The method of claim 13, wherein the different concentration of color ranges from 0 to 100 percent in ascending order.

15. The method of claim 13, wherein the column vectors of the estimated eigencoefficient matrix are linearized for tone calibration.

16. The method of claim 13, wherein the eigenmodel estimated reflectance is provided with a spectral difference correction factor by
computing the spectral difference correction factor as a difference between a logarithm of the eigenmodel estimated sample reflectance matrix and a logarithm of the measured sample reflectance matrix; and
multiplying the exponential of the spectral difference correction factor by the estimated reflectance.

17. The method of claim 13, wherein the estimated reflectance is provided with a spectral difference correction factor by
measuring a reflectance of two colors of ink with equal concentrations;
interpolating the measurements of the reflectance of the two colors of ink to determine the spectral difference correction factor;
multiplying the exponential of the spectral difference correction factor by the estimated reflectance.

18. A method for modeling color halftones, comprising:
measuring sample reflectance vectors of at least one color of ink;

measuring a sample reflectance vector for the paper on which the at least one color of ink is printed;

transposing the sample reflectance vectors to form columns of a measured reflectance matrix of at least one color of ink;

computing a cross-spectrum estimate matrix of the measured reflectance matrix of the at least one color of ink;

determining eigenvectors of the cross-spectrum estimate matrix for the at least one color of ink;

forming a measured orthonormal basis matrix for the at least one color of ink with the eigenvectors of the cross-spectrum estimate matrix of the at least one color of ink;

computing a measured eigencoefficient matrix for the at least one color of ink by projecting the measured sample reflectance matrix for the at least one color of ink onto the estimated orthonormal basis matrix for the at least one color of ink;

removing all column vectors of eigencoefficients with a norm of approximately zero from the measured eigencoefficient matrix for the at least one color of ink to obtain an estimated eigencoefficient matrix for the at least one color of ink;

removing all eigenvectors whose corresponding eigenvalues are zero from the measured orthonormal basis matrix for the at least one color of ink to produce an estimated orthonormal basis matrix for the at least one color of ink;

computing an eigenmodel estimated reflectance matrix with spatial correction for the at least one color of ink from the matrix product of the measured eigencoefficient matrix for the at least one color of ink and a transpose of the estimated orthonormal basis matrix for the at least one color of ink;

computing an estimated reflectance as the product of the eigenmodel estimated reflectance matrix and the exponential of the spatial correction for the at least one color of ink and a reflectance of the paper on which the at least one color of ink is printed, wherein each of the sample reflectance vectors has components that represent the reflectance at different wavelengths; and each of the sample reflectance vectors is taken from a different concentration of the at least one color of ink.

19. The method of claim 18, wherein the different concentration of color ranges from 0 to 100 percent in ascending order.

20. The method of claim 18, wherein the column vectors of the estimated eigencoefficient matrix are linearized for tone calibration.

21. A method for modeling color halftones, comprising:
measuring sample reflectances of K colors of ink;
measuring sample reflectances for a paper on which the K colors of ink are to be printed;
computing an eigenmodel for each of the K colors of ink;
computing an estimated reflectance as the product of the eigenmodel estimated reflectance for each of the colors of ink and the reflectance of the paper on which each color of ink is printed.

22. The method of claim 21, wherein K=3 and the colors of ink are Cyan, Magenta and Yellow.

23. The method of claim 22, wherein computing the eigenmodel further comprises:
computing a cross-spectrum estimate for each color of ink from the sample reflectances;
performing an eigenanalysis of the cross-spectrum estimate for each color of ink; and
computing an eigenmodel estimated reflectance for each color of ink.

24. The method of claim 23, wherein the eigenmodel estimated reflectance includes a spatial correction factor.

25. The method of claim 23, wherein computing an estimated reflectance with spatial difference correction comprises the step of taking the product of the estimated reflectance and an exponential of the spatial difference correction factor.

* * * * *